Patented July 7, 1942

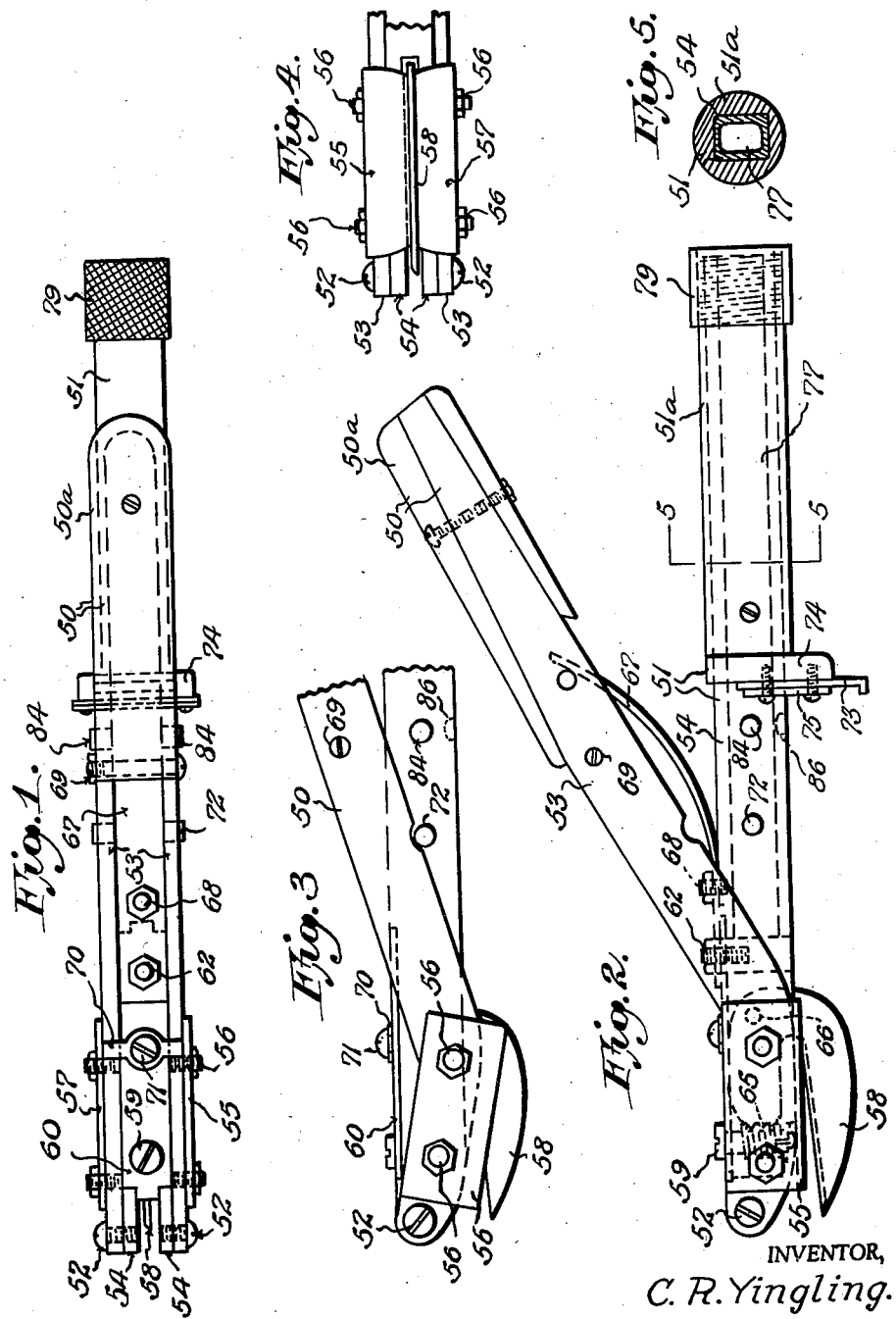

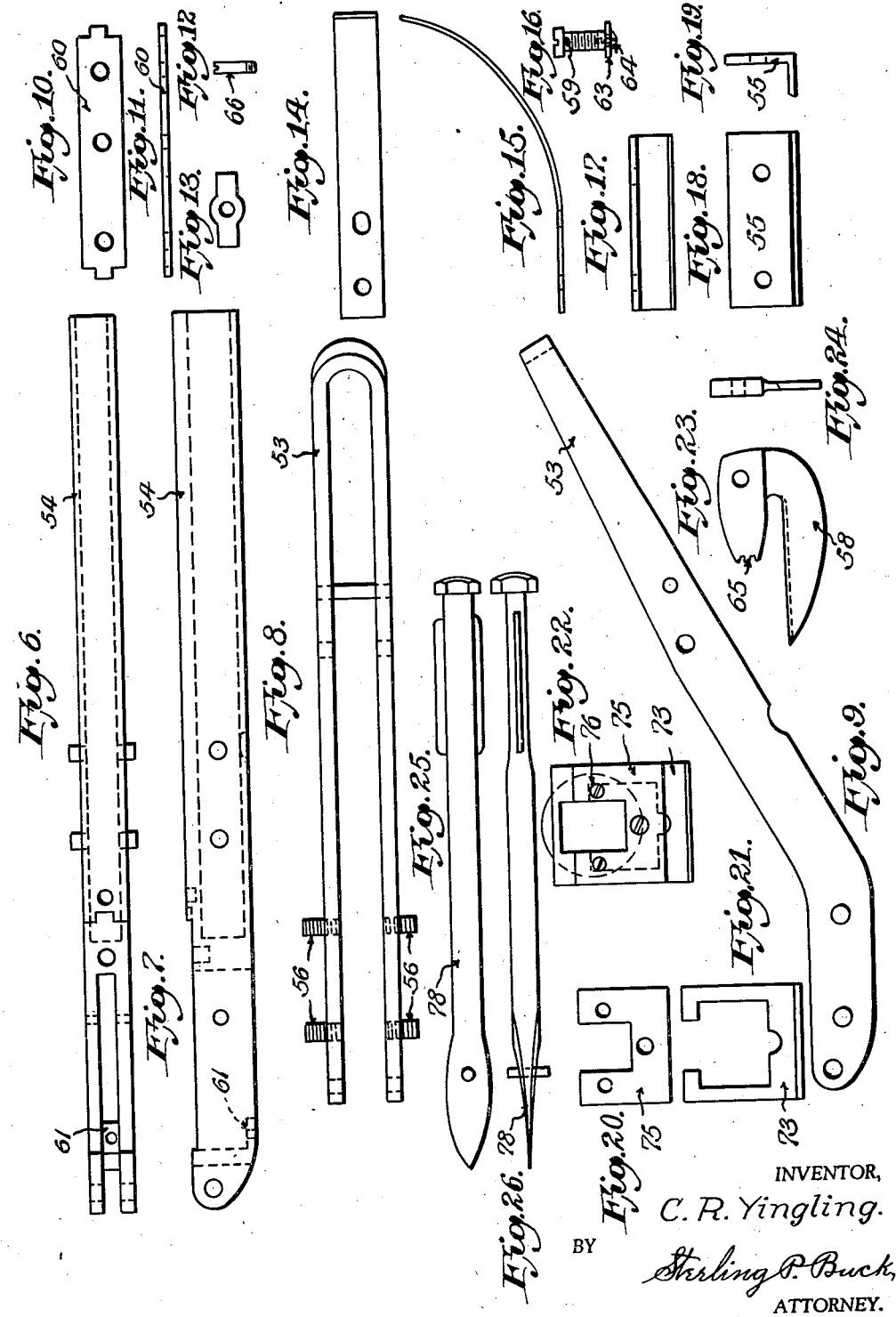

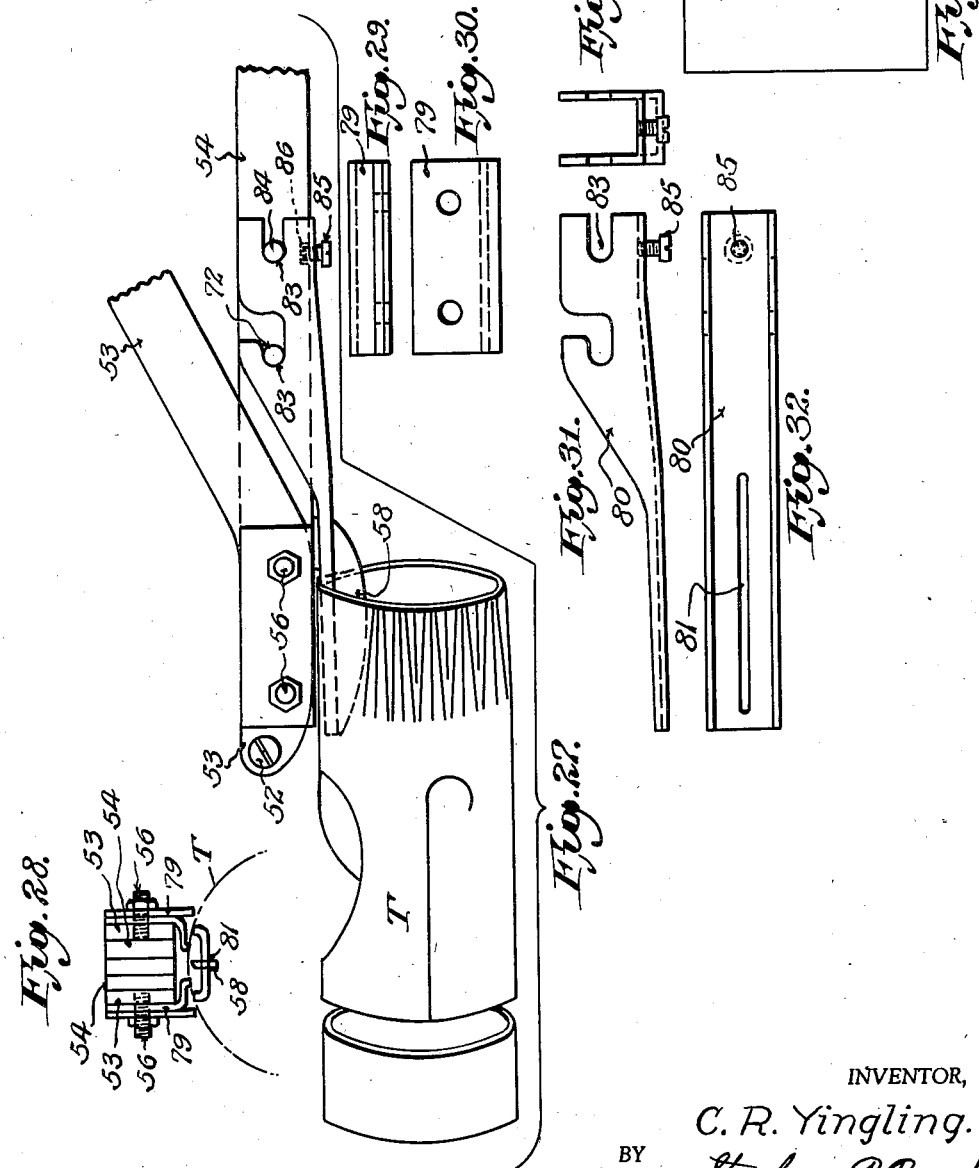

2,289,230

UNITED STATES PATENT OFFICE 2,289,230

CONVERTIBLE AND ADJUSTABLE HAND TOOL FOR SHEARING AND CRIMPING SHEET METAL

Charles R. Yingling, Baltimore, Md., assignor of one-half to Edward J. Sachs, Baltimore, Md.

Application April 29, 1940, Serial No. 332,355

12 Claims. (Cl. 30—253)

This invention relates to combination hand tools, and especially, to a convertible and adjustable hand tool for shearing and crimping sheet metal.

In sheet-metal work such as is known as spouting and guttering, viz., cutting drain-spout and gutter units and fitting them together on the eaves and other parts of buildings, certain gages and patterns are used as guides to aid in defining scribe-lines; and such scribe-lines are produced on the outer surfaces of lengths of spout or tube and gutter, some parts of the scribe-lines being straight, some plain-curved and some compound-curved. The same is true in cutting and fitting smoke-pipe, conductor or conveyer pipe etc. for various purposes; and heretofore, where the cutting is done by means of ordinary "tinner's shears" or "snips," there is a great waste of time and material for the reason that the first cut in a length of spout or tube cannot accurately follow a scribe-line therearound, so the cut is made first at a short distance from the scribe, and a second and sometimes a third cut is required for trimming to the scribe-line and producing an unbent or clean-cut edge along the scribe line. In cutting off a length of stove-pipe or furnace pipe or other large-diameter thin-wall pipe, time is saved (when using ordinary hand-shears or snips) by beginning at one end of the length of pipe, cutting in a spiral to a point near the scribe-line or cut-off mark, then gradually cutting around to the scribe-line or mark and then following the circumferential line or mark; and it is obvious that this procedure often spoils a length of pipe that could be used to advantage if not spoiled, and also results in a lot of sharp-edged and sharp-pointed scrap that is dangerous to leave around, and troublesome to remove.

The main object of the present invention is to provide an improved sheet-metal shearing device that can be operated to cut sheet-metal pipes or tubes or down-spouts in two, either at right angles to the axis, or diagonally thereto by following a scribe-line without need of a second or trimming cut, and with no waste of time or material.

Another object is to provide an improved sheet-metal-shears with its shearing edges properly arranged for cutting along a line or mark across the top of a pipe or tube where it is in visible position, in contradistinction to the procedure employed with the usual right-hand shears or snips where the user attempts to follow a line across the bottom of the pipe or tube which line is hidden under the pipe or tube.

Another object is to provide an attachment which, when in place on the shearing device, cooperates with the lower blade for crimping an end of the pipe so as to form the latter with a tapered and reduced end that can be inserted and wedge-fitted into an adjoining end of another length or section of pipe or tube, thereby to avoid the trouble and expense of having and carrying a separate end-crimper.

Another object is to provide a shearing device of this kind with a pivotally mounted shearing blade having manually operable means to adjust it about its pivot so as to dispose its cutting edge at different angles to the complemental or cooperative shearing blade, thereby to facilitate its best operation on various bends and thicknesses of sheet metal and on plain sheets of metal.

Another object is to have the adjustable blade so thin that its distortion of the sheared edges is minimized, and to provide an abutment or backing plate thereagainst to prevent it from bending away from the complemental shearing blade during the shearing operations.

Another object is to provide an improved shearing device that has a spring for opening it, in contradistinction to snips and the like which need to be opened by pressure of the backs of the user's fingers which are made sore and calloused thereby.

Another object is to provide this shearing device with a compartment having normally therein a starting blade for making a primary opening in a pipe or tube so that the lower or pivotally mounted blade or shearing jaw can be passed to the interior of the pipe or tube so as to cooperate with the jaw on the outer side of the pipe or tube and thereby to cut a piece out or to cut the pipe or tube in two.

Other objects, important features and advantages will be pointed out or implied in the following details of description, in connection with the accompanying drawings in which:

Fig. 1 is a top plan view of my improved shearing device.

Fig. 2 is a left side view of the same device as in Fig. 1, the jaws being open.

Fig. 3 is a left side view of the front part of the shearing device, the handles being broken off, and the shearing jaws or blades being in their close relation to one another.

Fig. 4 is a fragmental assembly in which the front end of the shearing device is viewed from the under side.

Fig. 5 is a sectional view taken along the line 5—5 of Fig. 2.

Fig. 6 is a top plan view of the hollow and slotted lever that carries the lower blade or jaw and the means for adjusting said jaw.

Fig. 7 is a side view of the lever seen in Fig. 6.

Fig. 8 is a top plan view of the main part of the bifurcated bent lever that straddles the lever shown in Figs. 6 and 7 and is normally pivoted to the latter.

Fig. 9 is a left-side view of the unit shown in Fig. 8.

Fig. 10 is a top plan view of a bearing plate that is normally removably secured on front part of the unit shown in Figs. 6 and 7.

Fig. 11 is a lateral edge view of the plate shown in Fig. 10.

Fig. 12 is a side view of a pivot-screw on which the adjustable jaw or blade is pivoted.

Fig. 13 is a top plan view of a button or abutment for limiting the movement of the lever-units about their pivotal connection.

Fig. 14 is a top plan view of a spring that is normally secured to the unit shown in Figs. 6 and 7.

Fig. 15 is an edge view of the spring shown in Fig. 14.

Fig. 16 is a conventional side view of an "Acme" screw having a washer secured thereon by a screw and adapted to be pivotally mounted in the members shown in Figs. 6 and 10 for engagement with a gear-segment on the member of Fig. 23, for effecting adjustments of the latter member.

Fig. 17 is a top plan view of a jaw or blade such as is normally in cooperative relation with the adjustable blade of Fig. 23.

Fig. 18 is a side elevation of the jaw or blade seen in Fig. 17.

Fig. 19 is an end view of the blade or jaw of Figs. 17 and 18.

Fig. 20 is a front elevation of a clamp-plate.

Fig. 21 is a front elevation of an adjustable guard-plate such as is normally held in adjusted position by the clamp-plate of Fig. 20.

Fig. 22 is a front view of an assembly of the parts shown in Figs. 20 and 21 and their adjuncts.

Fig. 23 is a left side elevation of an adjustable jaw or blade such as is normally pivoted to the lever of Figs. 6 and 7 by means of the pivot of Fig. 12.

Fig. 24 is a front end view of the jaw or blade of Fig. 23.

Fig. 25 is a side elevation of a starting punch or blade to enable the adjustable blade to be inserted in the side of a piece of tube or pipe.

Fig. 26 is a view of the unit shown in Fig. 25, as seen from either the upper or lower side.

Fig. 27 is a view partly in perspective, showing parts of the front end of the shearing device with crimping attachments thereon and in the proper working relation with an end of a pipe section for crimping and thereby reducing and tapering the pipe-end.

Fig. 28 is an elevation of the front end of the crimping device shown in Fig. 27.

Fig. 29 is a top plan view of one of the attachments that are interchangeable with the jaws of Figs. 17 and 18, for converting the shearing device to a crimping device.

Fig. 30 is a side view of the attachment shown in Fig. 29.

Fig. 31 is a left-side elevation of a trough-like attachment for use in combination with the units shown in Figs. 6, 23 and 29 for crimping as shown in Fig. 27.

Fig. 32 is a top plan view of the attachment shown in Fig. 31.

Fig. 33 is a rear end-view of the unit shown in Figs. 31 and 32.

Fig. 34 is a view showing a piece of sheet metal having an uneven curve-cut made therein, also a straight cut, showing how this leaves the sheet undistorted after being cut with a shearing device such as the one herein disclosed.

Referring to these drawings in detail, in which, similar reference numerals refer to similar parts in the several views, the invention is described in detail as follows:

Two hand-levers 50 and 51 are pivotally connected at 52, and the main portions of these hand-levers are shown respectively at 53 and 54 in Figs. 1 to 9 inclusive. These portions or units 53 and 54 may be cast or otherwise formed of any appropriate metal or other material or combination of materials; but, as here shown, these units are both bifurcated at their front ends, and the bifurcated front end of the unit 53 straddles the bifurcated front end of the unit 54 (Figs. 1 and 4), and has a shearing jaw 55 removably secured thereon by means of screw-threaded elements 56. On the opposite side from the jaw 55, an abutment 57, also removably secured by screw-threaded elements 56; the difference between the jaw 55 and abutment 57 being that the jaw 55 has a beveled or acute edge against the adjustable jaw, 58, whereas, the abutment 57 has a rectangular edge portion whose narrow surface is flat against the thin blade or jaw 58. In this connection, it should be understood that the blade or jaw 58 is thin as is practical, consistent with necessary strength, so as to minimize distortion of the sheet metal edges where cut with this combination of blades or jaws; so the purpose and function of the abutment 57 is to keep the blade 58 tight against the blade or jaw 55 while also keeping the sheet metal from being raised and distorted by upward pressure of the blade 58 during the operation of cutting the sheet metal.

The combination thus far described is useful and effective, the operation of cutting being as follows:

Assuming that a piece of sheet metal is first scribed along right and left curves then inserted between the jaws or blades 55 and 58 in Fig. 2; and that the hand-levers 50 and 51 are grasped and pressed towards one another so as to swing them about their pivotal connection 52, to the position shown in Fig. 3; it will be seen that such action causes the jaws 55 and 58 to directly cooperate in producing a slit in the sheet metal, and that the abutment 57 indirectly cooperates by holding the thin blade or jaw 58 against being deflected or bent away from the jaw 55; and of course it will be seen that by opening the shearing device to the position or relation of parts shown in Fig. 2, and repeating the above-explained operation, the slitting of the sheet metal will proceed further and further, also, by turning the hand levers laterally as the slitting operation proceeds, and viewing the scribed line through the sight-opening in the bifurcated end of the lever 54, the slitting can be made to follow right and left curves, as shown in the pipe or tube section T of Fig. 27 and in the plain sheet of Fig. 34. Moreover, by forcing or projecting the blade 58 through the side of a length of sheet metal pipe, then operating the device as previously described, and either moving the device around the pipe, or turning the pipe towards the tool or shearing the device, the pipe can be thus cut in two without the disadvantages and waste of time and material explained in a preceding paragraph. In Figs. 1 and 2, it is seen that the front end of blade 58 is directly under the sight-opening, viz., the furcated end of the lever 54.

For purposes previously explained, it is desirable and advantageous to adjust the angle of the cutting edge of the blade 58 with respect to the edge of the blade 55, and while any appropriate means may be employed for such adjustment, the means here disclosed consists of an acme screw or square-thread screw 59 pivotally mounted in bearings 60 and 61 (Figs. 1, 2, 6, 7, 10 and 11), the latter being preferably an apertured integral part of the hand-lever-member 54, but the bearing 60 being preferably an apertured plate removably secured to the hand-lever-member 54 by means of screw-threaded means shown at 62 (Figs. 1 and 2) in cooperation with a washer 63 and screw 64 (Fig. 16), these and the head of the screw 59 preventing longitudinal or axial motion of the screw 59 while permitting the latter to be rotated with a screwdriver or other appropriate means. The threads of the screw 59 are engaged with a toothed segment 65, so that the rotation of the screw 59 moves the segment 65 and the jaw 58 about the pivot 66 (Figs. 2 and 12), the direction of adjustment of the jaw 58 being determined by the direction of turning the screw 59.

A spring 67 is secured in place by the screw-threaded means 62 and 68, and presses upward against an abutment or cross-bolt 69 in apertures of the lever-unit 53. An abutment or button 70, pivoted on a screw 71, is normally in the position to limit the movement of the handles on the levers 50 and 51 away from each other; and studs 72 serve as abutments to limit the movement of the handles (or free ends of the hand-levers) toward one another, thereby preventing the front ends of the jaws 55 and 58 from meeting in the sheet being sheared.

Handle elements or grips 50a and 51a are shown as preferable constructed, but use of the same is optional with the manufacturer or user of the shearing device.

An adjustable guard 73 is normally held in place on a guard-seat 74 by means of a clamp-plate 75 and screws 76 (Figs. 1, 3, 20, 21, 22); and this combination protects the user's hand against contact with edges of the metal being sheared; and it also provides an effective means to prevent the user's hand from sliding forward while the user advances the tool along the line to be followed in shearing operations. For some shearing operations, the shield or guard 73 would interfere when extended to the position shown in Fig. 2, so it can then be adjusted to a higher position, and can be held in any adjusted position by means of the clamp-plate and screws.

In some cases, it is necessary to first cut a hole in the sheet or tube to be sheared; and for convenience of the user, the lever 51 is tubular at its rear end portion to provide a chamber, as shown at 77 in Figs. 2 and 5. A punch-blade 78 is normally carried in said chamber 77, being retained therein by means of a screw-cap 79 which latter is easily unscrewed and removed when use of the punch-blade 78 is desired.

After cutting off a length of tube or pipe from a previously longer piece, it is in many cases desirable and necessary to reduce the cut-end so it will be insertable in another piece of its kind; and the unitary result to be accomplished is the proper sizing or dimensioning of the pipe or tube so it can be fitted into its intended place. Therefore, the shearing device can be changed to an end-reducing and tapering device by means of crimping attachments such as shown in Figs. 27 to 33 inclusive. The change is made by taking the parts 55 and 57 off the studs or screw-threaded elements 56 and securing the parts 79 in places from which the parts 55 and 57 were removed; and by securing the trough-like unit or slotted crimp-bar 80 (Figs. 27, 31, 32 and 33) on the lever-member 54 in the position shown in Fig. 27. When the crimp-bar or supplemental crimp-jaw is in place or normal position shown in Fig. 27, the jaw 58 extends through the slot 81 and serves as the central or primary crimp element, for it will not then shear the metal in absence of the cooperative jaw 55. In Figs. 27 and 28, the tube T is shown in the proper relation with the crimp-elements 58, 79 and 80 to be crimped thereby when the hand-levers are repeatedly pressed towards one another and alternately permitted to move from one another while the operator effects a step by step relative movement of the sheet metal tube and the crimping tool circumferentially of the tube.

It will be seen, therefore, that I have provided not only a very practical and effective shearing tool, but a combined shearing and crimping tool that is very effective, practical and convenient for various purposes, especially for dimensioning and shaping a length of tube or pipe for properly fitting into a series of tubes and the like, which series is required to be of a predetermined length.

Though any appropriate means may be provided for securing the unit 80 in its normal working position, the means here shown permits of very quick attaching and removing, viz., stud-seats 83 for engagement with studs 72 and 84, in combination with a screw 85 threaded in an opening through the unit 80 and adapted to be engaged with a cavity 86 in the unit 54 of the lower hand-lever.

I do not intend to limit my paent protection to the precise details of description in the foregoing, for the invention is susceptible of numerous changes within the scope of the inventive ideas as implied and claimed.

What I claim as my invention is:

1. In a shearing tool, the combination of an elongated unit having a front end-portion formed with a slot therealong, a shearing jaw having an upper part secured in said slot while its lower part includes a shearing edge below said front end portion and extending forwardly therealong and terminating at a point substantially at the extreme front end of said elongated unit, a bifurcated lever having its furcations straddling said front end-portion of said elongated unit and pivotally connected thereto substantially at said extreme front end, and a complemental shearing jaw comprising an upright portion and a horizontally offset portion, said horizontally offset portion having a shearing edge normally against and extending along the first said shearing jaw in the proper relation for shearing cooperation of the shearing edges when the said lever is moved about its pivotal connection in the proper direction, said upright portion of the complemental shearing jaw being normally secured on one of said furcations.

2. In a shearing hand-tool, the combination of a hand-lever having a front end-portion formed with a slot therealong, a shearing jaw having an upper part secured in said slot while its lower part includes a shearing edge below said front end portion and extending forwardly therealong and terminating substantially at the extreme front end of said hand-lever, a bifurcated hand-lever having its front end straddling said front end-portion of the first said hand-lever and pivotally connected thereto substantially at said extreme front end, and a complemental shearing jaw comprising an upright portion and a horizontally offset lower portion, said horizontally offset lower portion having a shearing edge normally against and extending along the first said shearing jaw in the proper relation for shearing cooperation of these shearing edges when said hand-levers are moved in the proper direction about their pivotal connection, the upright portion of said complemental shearing jaw being normally secured on one of said furcations.

3. The combination defined by claim 1, and means to adjust the angle of the first said shearing edge with respect to said front end-portion and thereby to effect adjustment of the first said shearing edge with respect to that of said complemental jaw.

4. The combination defined by claim 2, and means to adjust the first said shearing jaw with respect to said front end-portion and thereby effects its adjustment with respect to said complemental shearing jaw.

5. The combination defined by claim 1, the first said shearing jaw being pivotally mounted and provided with a screw-engaging tooth at one end, and a screw having its thread engaged with said tooth and being mounted in said front end-portion and secured against axial movement and rotatable for effecting adjustments of the first said shearing jaw with respect to the complemental shearing jaw.

6. The combination defined by claim 2, the first said shearing jaw being pivotally mounted and provided with screw-threaded means for adjusting it about its pivot.

7. The combination defined by claim 1, the first said shearing jaw being quite thin for minimizing distortion of edges of a slit effected thereby during the operation of shearing, and an abutment normally in proper position against the first said shearing jaw to prevent deflection of the latter away from said complemental shearing jaw.

8. The combination defined by claim 2, and means against the first said shearing jaw to prevent lateral deflection of the latter away from the complemental shearing jaw.

9. The combination defined by claim 1, said elongated unit having a front end provided with a sight-opening therethrough, the first said shearing jaw having its front end under said sight-opening so the user can see scribe-lines to be followed by the first said shearing jaw and regulate the position of the first said shearing jaw with respect to the scribe-line.

10. The combination defined by claim 2, the first said hand-lever having a sight-opening over the first-said shearing jaw so the user can see how to regulate the position of the first said shearing jaw with respect to a scribe-line on a piece or article of sheet metal being sheared.

11. The combination defined by claim 1, and an abutment normally on said bifurcated lever and against the first said shearing jaw to prevent lateral deflection of the latter, said abutment and complemental shearing jaw being removable, and means attachable to said bifurcated lever and elongated unit for cooperating therewith and with the first said shearing jaw when said shearing jaw and abutment are removed, so as to reduce the diameter of a sheared end of a length of pipe or tube and thereby complete the unitary result of obtaining a pipe or tube of the desired or predetermined length and shape.

12. The combination defined by claim 2, and an abutment normally on said bifurcated hand-lever and against the first said shearing jaw, said abutment and complemental shearing jaw being removable, and means attachable to the first said hand-lever and second said hand-lever for cooperation therewith and with the first said shearing jaw when said abutment and complemental shearing jaw are removed, thereby to reduce the periphery of a sheared end of a pipe or tube and thus complete the unitary result of providing or obtaining a pipe or tube of a desired or predetermined length and shape.

CHARLES R. YINGLING.